Aug. 18, 1942.   F. KAHN   2,293,064
RELATIVE HUMIDITY METER
Filed Sept. 10, 1938   4 Sheets—Sheet 1

INVENTOR
Frank Kahn

Aug. 18, 1942.  F. KAHN  2,293,064
RELATIVE HUMIDITY METER
Filed Sept. 10, 1938  4 Sheets-Sheet 2
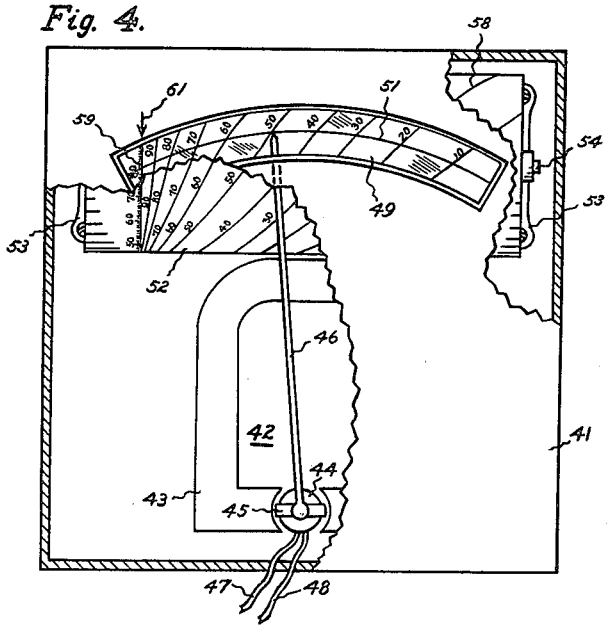
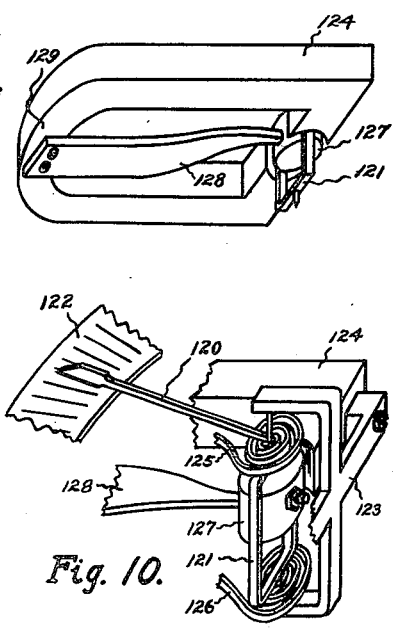
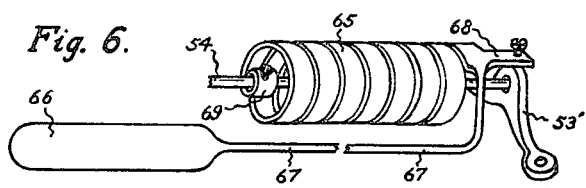
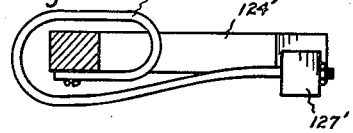
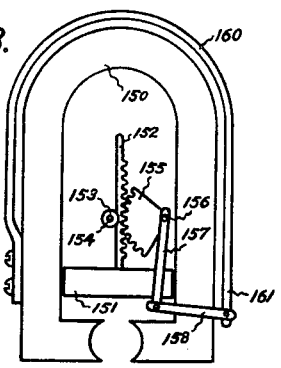
INVENTOR
Frank Kahn Aug. 18, 1942.                F. KAHN                 2,293,064
                      RELATIVE HUMIDITY METER
               Filed Sept. 10, 1938        4 Sheets-Sheet 3
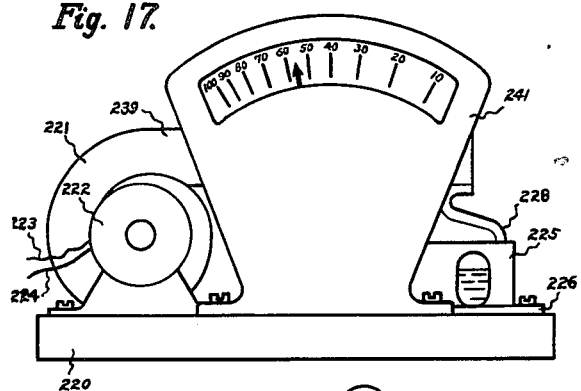
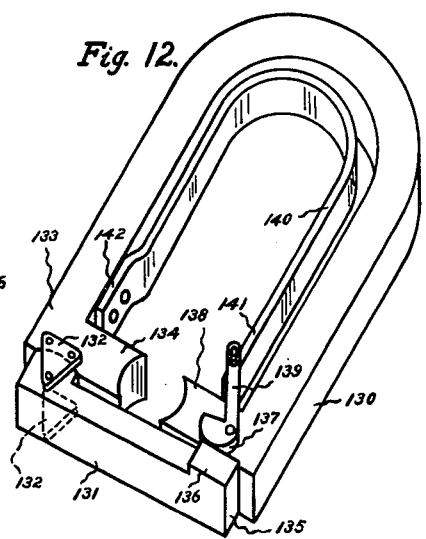
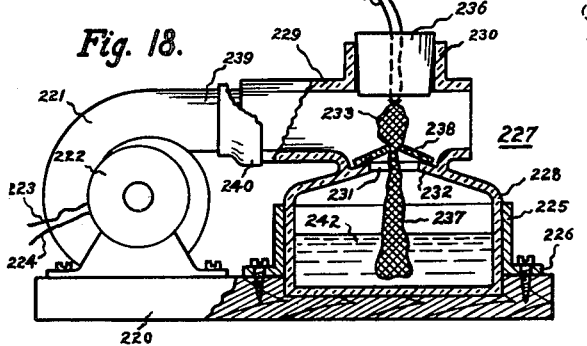
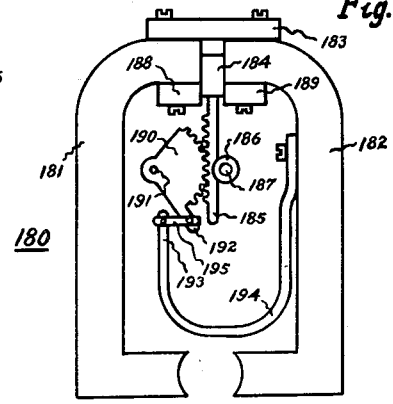
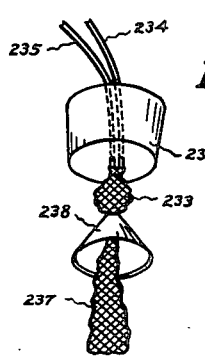
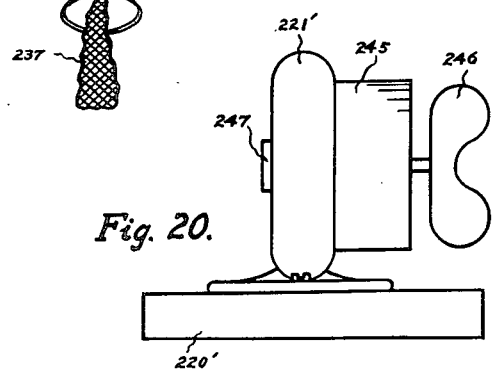
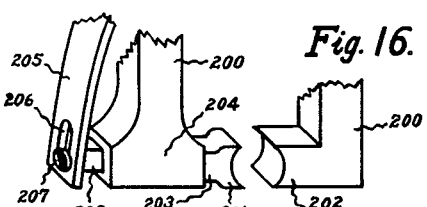
INVENTOR
*Frank Kahn*

Aug. 18, 1942. F. KAHN 2,293,064
RELATIVE HUMIDITY METER
Filed Sept. 10, 1938 4 Sheets-Sheet 4
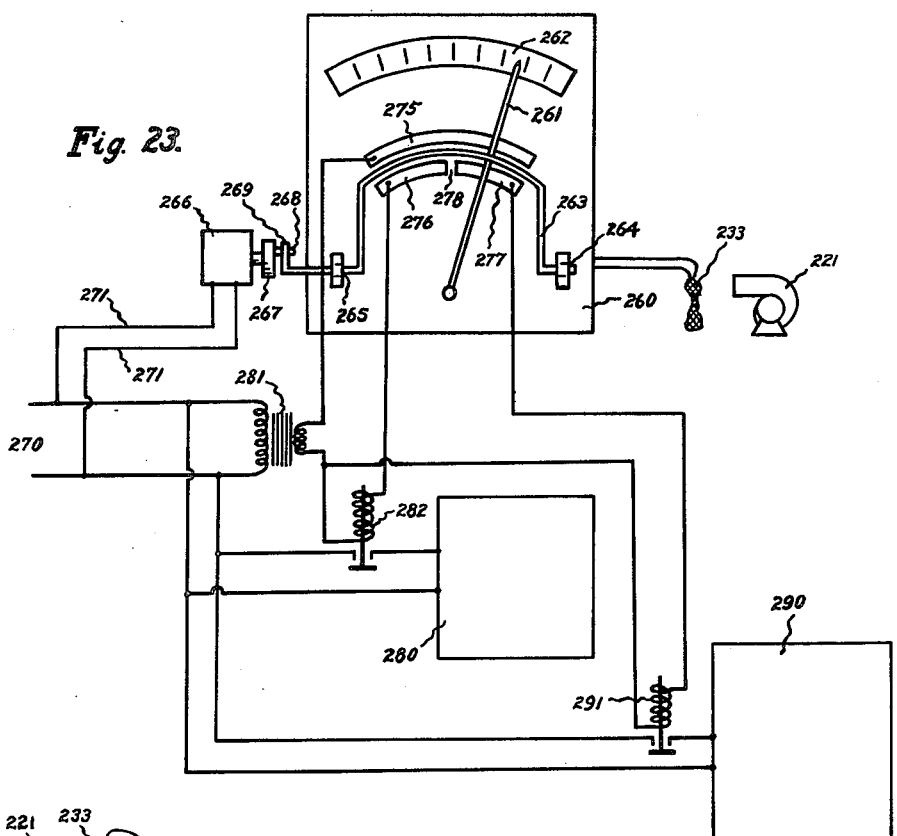
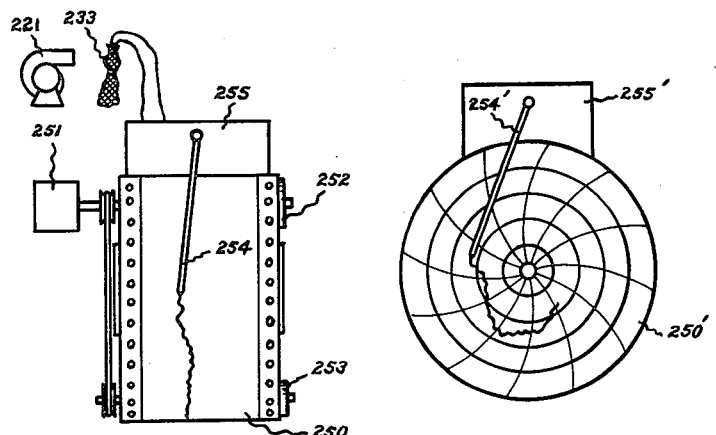
Fig. 23.
Fig. 21.
Fig. 22.
INVENTOR
Frank Kahn Patented Aug. 18, 1942

2,293,064

UNITED STATES PATENT OFFICE 2,293,064

RELATIVE HUMIDITY METER

Frank Kahn, Philadelphia, Pa.

Application September 10, 1938, Serial No. 229,281

15 Claims. (Cl. 236—44)

This invention relates to hygrometry and, more particularly, relates to a thermocouple relative humidity meter.

The most convenient and most generally employed method for measuring the degree of saturation of the atmosphere with moisture is to observe the temperature of evaporation—that is, the difference between the dry-air and wet-air temperatures. The dry-air temperature is read with the ordinary thermometer. The wet-air temperature may be accurately observed with the sling or whirled psychrometer or with the wet-air thermocouple described in Patent No. 2,128,462, dated August 30, 1938, issued to E. R. Wayne and myself and relating to thermocouple hygrometers. With the difference between the dry-air and wet-air temperatures determined, the relative humidity may be obtained from the Weather Bureau psychrometric tables, or the equivalent standard formula or chart.

This method of determining relative humidity, although of high accuracy, is inconvenient and because it is not direct reading is unsuited for recording or for control of humidity conditioning apparatus. On the other hand reasonably priced direct reading devices, which have been based upon relative tension of hygroscopic materials, are highly unreliable, and require much too frequent calibrations and adjustments to render their use practical.

The increasing importance of air conditioning emphasizes the need for a simple, compact, inexpensive and reliable device for measuring relative humidity. Apparatus for this purpose heretofore available has been extremely large and expensive, very inconvenient and laborious to operate, or highly unreliable.

The primary object of my invention is to provide a direct reading relative humidity meter in which these defects are remedied.

An object of my invention is to produce a direct reading relative humidity meter of high accuracy.

Another object of my invention is to provide a reliable direct reading relative humidity recorder.

A further object of my invention is to produce an inexpensive, simple, durable, and reliable direct reading relative humidity indicator of good accuracy.

Another object of my invention is to provide an indicating instrument having an elastic scale.

Still another object of my invention is to provide a reliable control for humidity conditioning apparatus having a maximum of simplicity.

Still a further object of my invention is to provide a wet-air thermopile which when subjected to standard evaporating conditions will produce an E. M. F. which is accurately directly proportional to the difference between the dry-air and wet-air temperatures.

Another object of my invention is to provide an automatic direct-reading relative humidity meter which is accurate, occupies a minimum of space, requires very little water, and needs practically no attention or servicing.

With these and other objects in view, which will become apparent as the description proceeds, my invention is embodied in a relative humidity observing system which consists essentially of a wet-air thermocouple unit in a stream of the air being metered, an indicating or "cold" junction unit in the same air, a d'Arsonval type indicating meter in the thermocouple circuit, and means responsive to the dry-air temperature of the air being measured to cause the indication of the meter to vary as a function of the dry-air temperature.

The invention, both as to details of construction and combination of parts, will best be understood from the following description of a specific embodiment which I illustrate as an example, when read in conjunction with the accompanying drawings, in which:

Fig. 4 is a plan view, partly in section, of a high-accuracy relative humidity indicator according to my invention.

Fig. 5 is a perspective view of the rotatable scale of the indicator of Fig. 4.

Fig. 6 is a diagrammatic view of a remotely actuated thermo-sensitive element for rotating the scale of the device of Fig. 4.

Fig. 9 is a diagram of a modified meter element for use in the thermocouple circuit.

Fig. 10 is a fragmentary view, showing details of part of the device of Fig. 9.

Fig. 11 is a diagrammatic view, partly in section, of another form of thermostatic member for the device of Fig. 9.

Fig. 12 is a diagram of a d'Arsonval meter field magnet in which the armature flux-density is thermostatically controlled according to my invention.

Figs. 13, 14, 15 and 16 show other modifications of d'Arsonval meter field magnets adapted to provide temperature-controlled current-sensitivity.

Fig. 17 is a front elevation of the self-contained direct-reading relative humidity meter of my invention.

Fig. 18 is a fragmentary front elevation of the device of Fig. 17.

Fig. 19 is a perspective view of the wet-air unit of the device of Fig. 17.

Fig. 20 is a fragmentary side elevation of a modification of the device of Fig. 17 in which the electric fan motor is replaced by a spring motor.

Fig. 21 is a diagram of a strip chart recorder for use with my relative humidity meter.

Fig. 22 is a diagram of a circular chart recorder for use with my relative humidity meter.

Fig. 23 is a diagram of an arrangement for relative humidity control using the meter of my invention.

Figure 1:
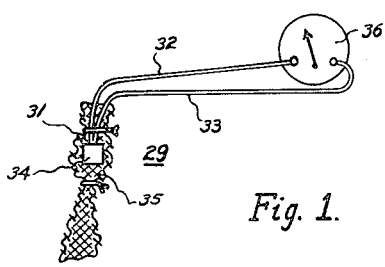
Fig. 1 is a diagrammatic representation of the thermocouple circuit of my invention having a single thermocouple.

Referring now to the drawings, I have shown in Fig. 1 a wet-air thermocouple unit 29 comprising a thermojunction 31 formed by union of two couple elements 32 and 33 secured with good thermal contact to a thermally conducting member 34, the whole being enveloped by an evaporative envelope 35. The thermocouple electric circuit is completed through a sensitive d'Arsonval-type ammeter 36, which forms the reference junction and which may be constructed in the manner more fully described hereinafter with reference to Figs. 4 to 16, inclusive. When the air to be measured is forced past the wet-air unit 29 at the proper velocity with the wick 35 suitably moistened and with the ammeter 36 at the dry-air temperature, the net E. M. F. of the circuit, and therefore the current in the circuit, is substantially proportional to the depression of the wet-air temperature below the dry-air temperature.

Figure 3:
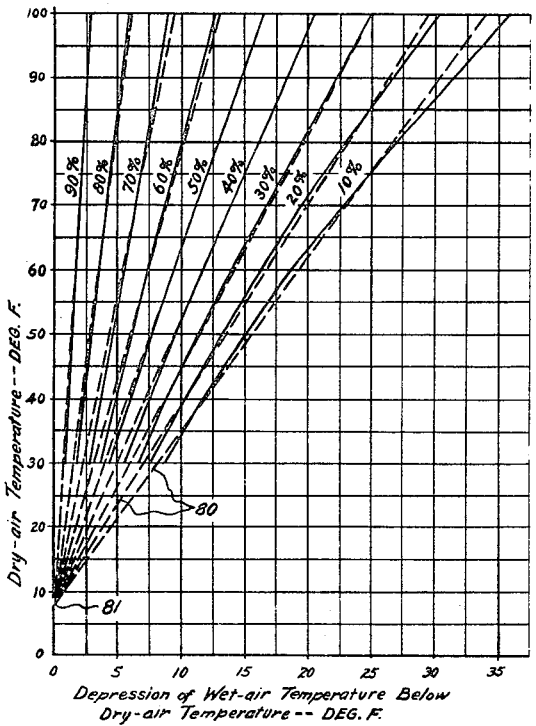
Fig. 3 is a diagram showing the relation of relative humidity to the dry-air temperatures and the difference between the dry-air and wet-air temperatures.

Fig. 3 is a graph in which the unbroken lines are curves of constant relative humidity, ordinates are dry-air or ambient temperatures, and abscissae are depressions of wet-air temperature below dry-air temperature. These data are plotted from the standard psychrometric tables in the United States Weather Bureau publication W. B. No. 235.

Fig. 4 shows a relative humidity indicator mounted in a case 41. A d'Arsonval element 42 having a magnet 43, core 44, moving coil 45, and pointer 46, forms the reference junction of a thermocouple circuit similar to that illustrated in Fig. 1, in which thermocouple leads 47 and 48 are suitably connected to energize coil 45. The end of pointer 46 is visible from outside the case 41 through a transparent view plate 49 on which is scribed a curved hair line 51 coinciding with the locus of movement of said pointer end. Mounted below the view plate 49 is a cylindrical chart scale 52 rotatably mounted on end brackets 53 journaled to receive a shaft 54 fixed axially to cylinder 52 by braces 55. One of the brackets 53 is provided with a projection 56 to which is affixed the inner end of a spiral bimetal element 57 the outer end of which is secured to cylinder 52. The cylindrical scale 52 is marked with the equivalent of the unbroken curves of graph of Fig. 3 except that in place of rectangular coordinates the abscissae are curves corresponding to the curvature of the line 51 and the lines of constant relative humidity 58 are marked in per cent relative humidity at relatively close intervals.

The operation of the device is as follows: The pointer 46 is deflected from its zero position 59 in accordance with the depression of wet-air temperature below dry-air temperature. The bimetal element 57 is constructed and arranged to rotate the chart 52 in accordance with the dry-air temperature so that the ordinate corresponding to the ambient or dry-air temperature will always register with the line 51. The ambient temperature may therefore be read at the point 59 of line 51 on the circumferential dry-air temperature scale of ordinates on the left side of chart 52. The end of pointer 46 will then indicate percent relative humidity quite accurately as correction of per cent relative humidity for change in atmospheric pressure from standard is practically negligible. An arrow 61 with other suitable marking on the outside of case 41 direct attention to the ambient temperature reading of the left hand scale of ordinates under point 59. The curved hair line 51 facilitates readings intermediate the lines 58. However, the scale 52 may be graduated to any degree of fineness desired.

In case this instrument is desired to indicate the relative humidity existing at some remote point, the rotatable scale 52 may be actuated by a temperature-sensitive fluid-actuated helix 65 as illustrated in Fig. 6. With the wet-air unit in the air to be measured there is placed a bulb 66 connected by tubing 67 to the helix 65, an extension 68 thereof being fixed to the bracket 53'. The free end 69 of helix 65 is attached to and arranged to rotate the axial shaft 54'.

Figure 2:
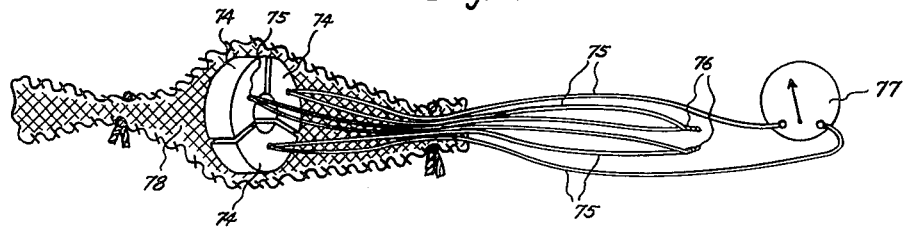
Fig. 2 is a diagrammatic representation of the thermocouple circuit of my invention having a three-junction wet-air unit.

In place of the wet-air unit illustrated in Fig. 1, greater current for the same wet-air depression may be obtained with the wet-air unit of Fig. 2, and thus make possible the use of a much less sensitive and therefore cheaper ammeter. In place of the element 34 of Fig. 1, there are shown in Fig. 2 three elements 74, each the functional equivalent of element 34. The thermocouples 75 are arranged as a thermopile with intermediate junctions 76 at the same temperature as the reference junction at ammeter 77. The elements 74 and attached thermocouples are electrically insulated from each other by shellac or other electric insulating coating which will not materially reduce the heat transfer to the evaporative envelope 78 from the elements 74.

Referring again to the graph of Fig. 3, I have shown corresponding respectively to the unbroken curves of constant relative humidity, an equal plurality of broken straight lines 80 diverging from a common point 81 on the axis of ordinates at about eight degrees Fahrenheit, one of said straight lines being drawn to coincide generally with each of the constant relative humidity curves between the ordinates 40 F. and 100 F. As is readily evident from Fig. 3, per cent relative humidity can thus be represented with good fidelity by a series of straight lines on a graph of dry-air temperature against depression of wet-air temperature below dry-air temperature. In order to read this approximately accurate per cent relative humidity directly it is merely necessary that the sensitivity of ammeters 36 or 77 be inversely proportional to the dry-air temperature above 8 F.

Figure 7:
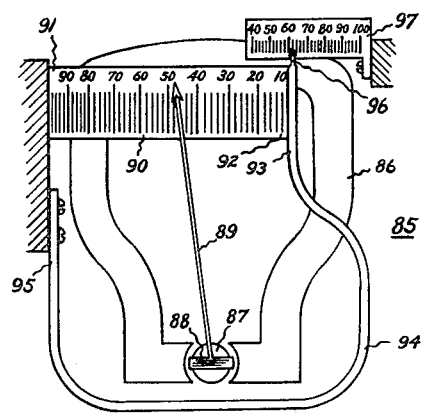
Fig. 7 is a diagrammatic view of a modification of my invention having a resilient scale.

One method of accomplishing this is illustrated in Fig. 7, in which a d'Arsonval ammeter 85 is comprised of a permanent magnet 86, core 87, moving coil 88, and pointer 89. In place of the customary scale, however, there is provided a resilient scale 90 composed of a flat rubber band, or the like, graduated in percent relative humidity with the spacing of the graduations proportional to the horizontal spacing of the broken relative humidity lines of Fig. 3. The left-hand end 91 of the scale 90 is fixed relative to magnet 86, while the right hand end 92 is attached to the temperature responsive or movable end 93 of a bimetal element 94 whose other end 95 is also fixed relative to magnet 86. When suitably connected to one of the wet-air units previously described, the pointer 89 of the ammeter 85 will deflect proportionally to the depression of the wet-air temperature below ambient, or proportionally to the abscissae of the graph of Fig. 3. The element 94 is constructed so that the movement of its end 93, and therefore the stretch of the resilient scale 90, in response to changes in ambient temperature, is such that for any ambient temperature between 40 F. and 100 F., the scale 90 will be stretched to correspond with the broken lines of the graph of Fig. 3 at the particular ambient temperature ordinate. Because the broken lines 80 are straight and converge to a point this is a simple matter. The departure in Fig. 3, of the broken lines from the unbroken lines, between the ordinates 40 F. and 100 F., show that the errors to be expected in reading this meter directly in relative humidity are of a low order.

A pointer 96 is attached to the end 93 of bimetal element 94 and is arranged to traverse a scale 97 fixed with respect to magnet 86 and suitably graduated in degrees of temperature.

Figure 8:
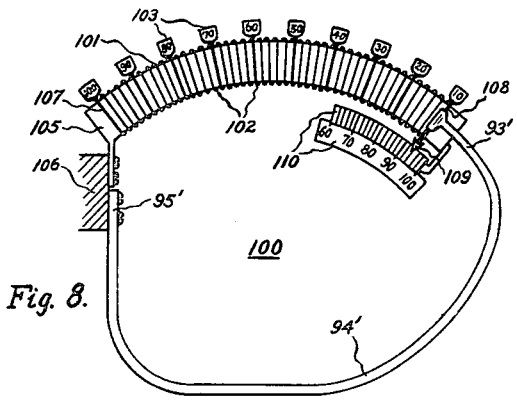
Fig. 8 is a diagrammatic view of another modification of my meter with resilient scale.

In place of the flat band 90, I have shown in the relative humidity meter 100 of Fig. 8, an elastic scale 101 composed of a flattened helical spring 102. The major or cardinal divisions are provided with index tabs 103 extending beyond the spring 102 and being marked with the appropriate value of per cent relative humidity.

A stiff internal core 105, suitably secured in fixed relationship to the frame 106 of the meter, supports the spring 102 in the desired scale shape, in this case illustrated as a circular arc. The left hand end 107 of scale 101 is secured to core 105. A bimetal element 94' has one end 95' fixed to the frame 106, with the other end 93' secured to the movable end 108 of scale 101. The separations of the individual turns of spring 102 are preformed to correspond to aliquot subdivisions of per cent relative humidity in accordance with the separations of the broken lines of the graph of Fig. 3, taking into account the shape of scale 101. A pointer 109 attached to the end 108 of scale 101 registers with an ambient temperature scale 110 fixed to core 105 so that the meter can also be used as a thermometer.

As previously explained, per cent relative humidity can be indicated directly by the thermocouple circuits of Figs. 1 and 2 with fair accuracy provided the current sensitivity of ammeters 36 or 77 be inversely proportional to the dry-air or ambient temperature above 8 F. A convenient means for accomplishing this object is illustrated in Figs. 9 and 10, in which a pointer 120, attached to a moving coil element 121 moves over a scale 122. The element 121 is rotatably mounted in a guide bracket 123 fixed to the customary permanent magnet 124, the restoring torque and current supply being by means of upper and lower spiral springs 125 and 126, respectively. A magnetic core 127 is supported between the poles of the magnet 124, within the coil 121, by a bimetal element 128 fixed to the magnet 124 at the equator part 129 opposite to the poles. The coil 121 differs from the usual construction in that it is considerably elongated and is mounted, in the embodiment illustrated, so that its top part is in the customary relation with its magnet and the elongated part extends downwardly well below the magnet. Vertical movement of the core 127, in response to changes in ambient temperature acting on bimetal element 128, varies the strength of the magnetic field in which coil 121 moves. The relative proportions of bimetal element 128, coil 121, core 127, and magnet 124 are such that the sensitivity of the instrument varies in inverse proportion to the temperature above 8 F. As illustrated, th device is in the position of maximum sensitivity or lowest ambient temperature. On increase of ambient temperature, bimetal element 128 propels core 127 downwardly, resulting in decreased sensitivity.

In Fig. 11 I have illustrated a construction similar to that of Figs. 9 and 10 except that the bimetal element 128' is considerably longer than the corresponding element 128 of Fig. 9 and therefore movement of the core 127' is more sensitive to change in ambient temperature. Compactness of construction is attained by wrapping element 128' about the equator end of the magnet 124'. Similarly, the number of wraps may be increased to attain any degree of sensitivity required.

The desired relation of current sensitivity to ambient temperature above 8° F. can be conveniently produced in the ammeter by suitably varying the flux density of the magnetic field surrounding the movable coil. One method of varying the field strength at the poles is by providing a shunt path for the magnetic flux. This is shown in Fig. 12, in which a field magnet 130 is provided with a keeper 131 swivelly attached by means of brackets 132 to the base 133 of one of the poles 134 of the magnet. The free end 135 of keeper 131 is provided with a vertical extension 136 which engages a cam 137 pinioned to the base of the pole 138 opposite the pole 134. A lever extension 139 of cam 137 is slidably linked to the movable end 141 of a temperature responsive bimetal element 140 which lies within the curve of the magnet 130 with its fixed end 142 attached to said magnet adjacent the pole base 133. Movement of end 141 of element 140 in response to temperature changes rotates the cam 137 thereby positioning the keeper against the attraction of the magnet 130 to vary the air gap between keeper end 135 and pole 138.

Another flux-shunting arrangement is illustrated in Fig. 13. A field magnet 150 is provided with a keeper 151 slidable perpendicularly to itself within the enclosure of said magnet by means of a rack 152 attached to the keeper 151 and guided by a roller 153 on a fixed pivot 154. Engaging the rack 152 is a gear sector 155 rotatable about a fixed pivot 156 and provided with a lever extension 157. The outer end of lever 157 is pivotally attached, by a link 158 arranged to clear the top surface of the magnet, to the movable end 161 of a bimetal element 160 which is curved about the equator section of magnet 150 and is fixed to the base of the pole opposite said movable end. A change in temperature causes the bimetal element 160 to rotate the sector 155 and force the keeper 151 closer to or farther from the magnet poles, thereby weakening or increasing the flux density in the field between the poles.

Flux density variation with temperature change may also be obtained with the magnetic circuit arrangement of Fig. 14, in which a field magnet 165 is divided at the equator in two parts 166 and 167, the magnetic circuit being completed by a magnetic member 168 arranged for rotation with axis perpendicular to the plane of the magnet. The two parts 166 and 167 of the magnet 165 are rigidly supported and held at the desired separation by U-shaped upper and lower nonmagnetic brackets 170 and 171 which are also adapted to house the bearings for the shaft 169 of member 168. A bimetal helix 172 has its outer end fixed to a pin 173 in the bracket 171 and its inner end attached to the shaft 169 so that the magnetic element 168 will be rotated when the ambient temperature is changed. The shapes of the magnetic element 168 and of the cooperating end surfaces of magnet parts 166 and 167 are such as to secure the desired relationship between the coil-field magnetic intensity and ambient temperature.

Another exemplification of flux density variation by temperature-controlled movement of a magnetic member uniting the two parts of a split d'Arsonval instrument field magnet is shown in Fig. 15. The magnet 180 is divided at the equator into two parts 181 and 182 connected and positioned by a non-magnetic yoke 183, so as to leave a space between said parts. The magnetic circuit is completed by a magnetic member 184 arranged to be reciprocated in and out of said space by means of a rack 185 attached to member 184, said rack being guided by a roller 186 on a fixed pivot 187, and said member 185 being aligned between guide 188 and guide 189, attached to the inner side of parts 181 and 182 respectively. A gear sector 190 rotatable about a fixed pivot 191 is provided with a lever extension 192 which is attached to the free end 193 of a bimetal element 194 by a pivoted link 195. Bimetal element 194 is curved about the inner periphery of the magnet 180 and has its fixed end attached near the equator end of the part 182 opposite said movable end 193. Changes in temperature vary the relative position of element 184 in and out of closure of the space between parts 181 and 182, thereby increasing or weakening the field between the poles of magnet 180.

Temperature-responsive variation of field strength may also be attained by increasing the length of the air gap between the poles of the field magnet of a d'Arsonval type instrument. In Fig. 16, this is accomplished in the magnet 200 by adapting one of the poles 201 to be movable toward or away from the conjugate fixed pole 202. The pole 201 is provided with a shank 203 reciprocable within an appropriate opening within the pole base 204 which is suitably enlarged and shaped to provide a guide therefor. The free end 205 of a bimetal element is provided with a slot 206 through which passes a screw 207 attached to the outer end 208 of shank 203. The fixed end of the bimetal element (not illustrated) is rigidly attached to the magnet 200, the movement of the bimetal element with temperature changes being such as to slide shank 203 within the pole base 204 and vary the length of the air gap and therefore its field intensity.

My invention, as embodied in a small self-contained compact portable relative humidity indicator, is illustrated in Figs. 17, 18, and 19. A base 220 has attached thereto a miniature centrifugal blower 221 driven by an electric motor 222 which is supplied with electricity via leads 223 and 224 from a suitable source of current supply (not illustrated) which may be A.-C. or D.-C. A collar bracket 225 is provided with an outward flange 226 which is attached by screws to the base 220. A container 227 having a cylindrical lower reservoir section 228, a duct section 229, and a mouth section 230, is held in place by the bracket 225 which fits about the reservoir 228. The duct 229 communicates with the reservoir 228 by way of an opening 231 rimmed by an annular shoulder 232, the mouth 230 being centered over the opening 231. A small wet-air thermocouple unit 233 which may be of the type shown in Figs. 1 or 2 or the equivalent thereof has its leads 234 and 235 extending through a cork or rubber stopper 236 which fits snugly into the mouth 230 so that the body of the wet-air unit 233 is suspended centrally within the duct 229 and the dependent wick 237 of the unit 233 passes through the opening 231 into the reservoir 228. A conical collar 238 of waxed paper or other non-absorbent material, is fitted over the wick 237 so that said collar rests on the shoulder 232, thereby sealing reservoir 228 and minimizing the rate at which water is evaporated therefrom. The exhaust vent 239 of the fan 221 abuts the inlet end of the duct 229 and the joint is made airtight with an elastic sleeve 240 which fits over both parts. A d'Arsonval meter 241 constructed according to any of the modifications hereinbefore described as being adapted to read directly in percent relative humidity when connected to a properly-conditioned wet-air thermocouple unit, is also attached to the base 220, the leads 234 and 235 of the wet-air unit being connected thereto.

The operation of this meter is as follows. The reservoir 228 is filled with water 242 through the mouth 230 and opening 231. The assembly comprising stopper 236, wet-air thermocouple 233, wick 237, and collar 238 is slipped into place through the mouth 230. Electric current is then supplied to the motor 222 causing the fan 221 to force a stream of air through the duct 229 over the unit 233. In a few seconds the temperature of the measuring junction of the unit 233 will be reduced to the wet-air temperature and the meter 241 will indicate per cent relative humidity in accordance with the broken lines of the graph of Fig. 3, as previously explained.

The illustrations of Figs. 17 and 18 depict the container 227 as made of glass but it may be made of any other suitable material such as metal or a resin. In place of the electric motor 222, a spring motor 245 with manual wind 246, on a base 220' illustrated in Fig. 20, may be used to drive the fan 221' which is shown with a screen or filter 247 to minimize accumulation of dirt in the duct and on the wet-air unit, although experience has shown that the wet-air unit will operate with good accuracy when quite dirty. The meter is designed for both continuous indication and for spot readings. In the latter case the fan is started and the indicating pointer of the meter 241 is observed until it reaches a minimum value of relative humidity, the steady state condition being reached in a few seconds as a result of the small size of the wet-air unit. Either of the wet-air units illustrated in Figs. 1 or 2 may be used with this meter, a less sensitive ammeter being required if the wet-air thermopile of Fig. 2 is used.

As illustrated in Fig. 21, the direct reading relative humidity meter can be used to record relative humidity continuously on a strip chart 250. The chart 250 is driven by a motor 251 operating a driving roller 252 and reroll 253. A marking pointer 254, suitably arranged to mark the chart 250, is actuated by a d'Arsonval element 255 which may be any of the elements previously described and illustrated in Figs. 9 to 16 in combination with wet-air unit 233, which may be either of the wet-air units shown in Figs. 1 and 2, in the air stream from fan 221. Similarly, a circular chart 250' illustrated in Fig. 22, may be used in place of the chart 250.

My invention is admirably adapted for relative humidity control, one method being illustrated in Fig. 23. A relative humidity meter 260, actuated by a d'Arsonval element arranged for response to relative humidity in accordance with the broken curves of Fig. 3 in conjunction with the wet-air unit 233 in the air stream from the fan 231, as previously set forth, is provided with a metal pointer 261 traversing a scale 262. A bail 263 pinioned on the meter face on each side of the pointer 261 at points 264 and 265, is periodically oscillated so that it is alternately pressed against and released from the pointer 261 by an electric motor 266 which rotates a wheel 267 carrying an eccentric pin 268 engaging a radial slot in a crank 269 on the end of the bail 263. The motor 266 is energized from an electric source 270 by means of conductors 271. On the meter face, in a position to be electrically contacted by the pointer 261 when it is depressed by the bail 263, are three arcuate contacts 275, 276, and 277. The contact 275, concentric with the axis of the pointer 261, extends across the entire path of the pointer so that it is contacted thereby in all positions of said pointer. The contacts 276 and 277 are arranged on adjacent arcs of a circle concentric with the contact 275 so that, as the pointer is moved from the left to the right end of the scale 262, the pointer periodically connects the contact 275 first with the contact 276, then the free space 278 between the contacts 276 and 277, and finally the contact 277. The space 278 is arranged to be centered at any position of relative huimidity and can be as wide as is desired. An electrically controlled humidifier 280 of the aspirator or evaporative type, energized from the source 270, is arranged to be operated when the contacts 275 and 276 are connected. A step-down transformer 281, with primary winding connected to the source 270, supplies low-voltage energy to the operating coil of a time-delay-reset relay 282 with instantaneous closing time-delay opening contacts, said coil being connected to the secondary winding of the transformer 281 in series with the contacts 275 and 276. The contacts of the relay 282 are arranged to close the electric circuit to the humidifier 280 on energizing the relay operating coil, the reset delay period of said relay being slightly greater than the interval between contacts of the pointer 261 with the contacts 275 and 276, so that the humidifier 280 will remain continuously energized while the pointer is in a position over the contact 276. When the pointer is over the space 278 for a period greater than the oscillation period of the bail 263, the relay 282 resets and deenergizes the humidifier 280. In a similar manner, an electrically controlled dehydrator 290, such as of the silica gel or refrigerative type, is energized from the source 270 in series with another similar time-delay-reset relay 291 whose operating coil is connected to the secondary winding of the transformer 281 in series with the contacts 275 and 277. It is thus seen that when the relative humidity is low (when pointer 261 is at the left end of the scale 262), the humidifier 280 will operate to raise the humidity until the pointer moves to the free space, whereupon it will cease to function. If the relative humidity rises to a point where the pointer 261 overlies the contact 277, the dehydrator will be operated to reduce the moisture content of the air. The space 278 can be adjusted to the characteristics of the conditioning apparatus to prevent hunting.

It should be realized that any of the foregoing meters are suitable for remote indication, recording, or control of relative humidity. It is well-known that in place of the thermosensitive elements, generally shown herein as bimetal devices, remotely actuated thermosensitive devices, such as that of Fig. 6 or its functional equivalent may be used. Such construction permits the meter in its various forms to be used for air in ducts or other inacessible places and the location of the meter itself to suit the convenience of the user.

The principle of the expansible scale in connection with my relative humidity meter is not intended to be limited to the use of an elastic medium. In place of the elastic or resilient scales of Figs. 7 and 8, the scale may be constructed in the manner of a folding fan or it may be constructed similarly to the iris of a camera, arranged to be positioned in accordance with the desired function of ambient temperature by a suitable bimetal element or the equivalent.

Although the invention has been described in considerable detail, such description is intended as illustrative rather than limiting, as numerous embodiments will be apparent to those skilled in the art. My invention, therefore, is not to be limited except insofar as is necessitated by the prior art or by the spirit of the appended claims.

I claim:

1. In a direct-reading relative humidity meter, a thermocouple circuit comprising (1) a wet-air thermocouple unit adapted to be exposed under standard evaporating conditions to the air to be measured, (2) a reference thermojunction in said air, and (3) an electric instrument having a current-responsive element responsive to the current in said circuit, said instrument also including means to vary the current sensitivity of said current-responsive element as a function of temperature.

2. The invention set forth in claim 1 characterized by the addition of means for directing a current of the air to be measured against said wet-air thermocouple unit.

3. The invention set forth in claim 1 characterized by the addition of means associated with said current-responsive element for producing a visible indication of the instantaneous position of said element.

4. The invention set forth in claim 1 characterized in that said means is constructed and arranged to vary the current sensitivity of said element substantially in inverse proportion to 8F less than the dry-air temperature of the air to be measured.

5. The invention set forth in claim 1 characterized by the addition of means for directing a current of the air to be measured against said wet-air thermocouple unit and reservoir means for supplying moisture to said wet-air unit.

6. The invention set forth in claim 1 characterized in that said instrument is of the d'Arsonval type and said current sensitivity varying means varies the reluctance of the field magnet.

7. The invention set forth in claim 1 characterized in that said instrument is of the d'Arsonval type and said current sensitivity varying means is bimetal powered to vary the reluctance of the field magnet.

8. The invention set forth in claim 1 characterized in that said instrument is of the d'Arsonval type and said current sensitivity varying means is bimetal powered to move the magnetic core of the moving element perpendicularly to the plane of the field flux.

9. The invention set forth in claim 1 characterized in that said instrument is of the d'Arsonval type and said current sensitivity varying means is a bimetal-powered movable magnetic-flux shunt.

10. In apparatus for relative humidity control, the combination of a thermocouple circuit comprising (1) a wet-air thermocouple unit adapted to be exposed under standard evaporating conditions to the air to be controlled, (2) a reference junction, and (3) an electric instrument having a current-responsive element responsive to the current in said circuit, said instrument also including means to vary the current sensitivity of said current-responsive element as a function of temperature, a humidifier, a dehydrator, and means controlled by said current-responsive element for selectively rendering said humidifier and said dehydrator effective for humidifying or dehydrating said air, respectively, said last-named means comprising an electric circuit including an energy source, a relay with instantaneous closing time-delay opening contacts for controlling said humidifier and an associated set of contacts for connecting said source to energize said relay, a second relay with instantaneous closing time-delay opening contacts for controlling said dehydrator and a second set of contacts for connecting said source to energize said second relay, and an automatic mechanism constructed and arranged with relation to said sets of contacts at periodic intervals to close said first-named contacts when the position of said current-responsive element is below a certain range of movement of said element and to close second contacts when its position is above said range, the timing of said mechanism and said relays being such that the contact-opening delay period of said relays is longer than the interval, whereby either relay, once energized, will retain its contacts in closed position if reenergized during the succeeding interval and will open its contacts if not so reenergized.

11. In apparatus for relative humidity control, the combination of a relative-humidity responsive element, a humidifier, an electric circuit including a relay with instantaneous closing time-delay opening contacts for controlling said humidifier, and automatic means for energizing and periodically reenergizing said relay within its contact-opening delay period as long as the position of said element is below a predetermined value of relative humidity.

12. In apparatus for relative humidity control, the combination of a relative-humidity responsive element, a dehydrator, an electric circuit including a relay with instantaneous closing time-delay opening contacts for controlling said dehydrator, and automatic means for energizing and periodically reenergizing said relay within its contact-opening delay period as long as the position of said element is above a predetermined value of relative humidity.

13. In apparatus for relative humidity control, the combination of a relative-humidity responsive element, a humidifier, a dehydrator, an electric circuit including a relay with instantaneous closing time-delay opening contacts for controlling said humidifier, a second electric circuit including a second relay with instantaneous closing time-delay opening contacts for controlling said dehydrator, and automatic means for energizing and periodically reenergizing said first-named relay within its contact-opening delay period as long as the position of said element is below a predetermined value of relative humidity and for energizing and periodically reenergizing said second relay within its contact-opening delay period as long as the position of said element is above another predetermined value of relative humidity.

14. In a direct-reading relative humidity meter, a thermopile circuit comprising (1) a wet-air thermopile unit comprising an evaporative envelope adapted to be subjected under standard evaporating conditions to the air to be measured, a plurality of thermocouple units electrically insulated from each other and enclosed within said envelope, the leads of said units constituting the sole means by which heat is introduced into the interior of said envelope, and said units and the thermal conductance of said leads being proportioned to the evaporative properties of the envelope such that said units are cooled substantially to the temperature of the surface of the envelope, (2) a reference and intermediate thermojunctions arranged to attain the temperature of said air, and (3) an electric instrument having a current-responsive element responsive to the current in said circuit and means to vary the current sensitivity of said element as a function of temperature.

15. In a direct-reading relative humidity meter, a thermopile circuit comprising (1) a wet-air thermopile unit adapted to be exposed under standard evaporating conditions to the air to be measured, (2) a reference and intermediate junctions arranged to attain the temperature of said air, and (3) an electric instrument having a current-responsive element responsive to the current in said circuit, said instrument also including means to vary the current sensitivity of said current-responsive element as a function of temperature.

FRANK KAHN.